US007352712B2

(12) United States Patent
Edwards et al.

(10) Patent No.: US 7,352,712 B2
(45) Date of Patent: Apr. 1, 2008

(54) SYSTEM AND METHOD FOR DETECTING A DELAY IN A COMPUTER NETWORK

(75) Inventors: Robert Edwards, Costa Mesa, CA (US); Carl Mower, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 170 days.

(21) Appl. No.: 11/245,571

(22) Filed: Oct. 7, 2005

(65) Prior Publication Data

US 2007/0081476 A1 Apr. 12, 2007

(51) Int. Cl.
*H04Q 7/20* (2006.01)

(52) U.S. Cl. ...................... 370/310; 370/328; 370/329; 370/330; 370/336; 370/345; 455/560; 455/500; 455/502; 455/501; 455/426.1; 455/426.2; 455/403; 709/203; 709/202; 709/219; 709/218

(58) Field of Classification Search ................ 370/310, 370/328, 329, 330, 336; 455/345, 500, 69, 455/522, 422.1, 403, 67.11, 423, 424, 425, 455/426.1, 426.2, 502, 550.1, 560, 412.1, 455/412.2, 445, 558, 458, 79, 90.1, 90.3, 455/501; 709/203, 202, 219, 218
See application file for complete search history.

(56) References Cited

U.S. PATENT DOCUMENTS 5,974,057 A * 10/1999 Rozanski et al. ........... 370/519
7,145,958 B2 * 12/2006 Yoneyama .................. 375/267
2002/0198984 A1 12/2002 Goldstein et al.
2004/0132475 A1 * 7/2004 Ishii et al. .................. 455/522

FOREIGN PATENT DOCUMENTS

EP 1429490 6/2004

* cited by examiner

*Primary Examiner*—Keith Ferguson
(74) *Attorney, Agent, or Firm*—Fay Kaplun & Marcin, LLP

(57) ABSTRACT

Described is a system comprising a computing device, a wireless computing unit and a network management arrangement ("NMA"). The NMA receives a first signal and a second signal from the computing device. The NMA forwards the second signal to the unit and receives a third signal from the unit which is an acknowledgment of receipt of the second signal. The NMA determines a first time value indicative of a difference between a time of receipt of the first signal and a time of receipt of the second signal. The NMA compares the first time value to a first threshold range to generate a first output data. The NMA determines a second time value indicative of a difference between a time of transmission of the second signal and a time of receipt of the third signal. The NMA compares the second time value to a second threshold range to generate second output data. The NMA executes a response procedure as a function of at least one of the first and second output data.

21 Claims, 5 Drawing Sheets

Figure 4:
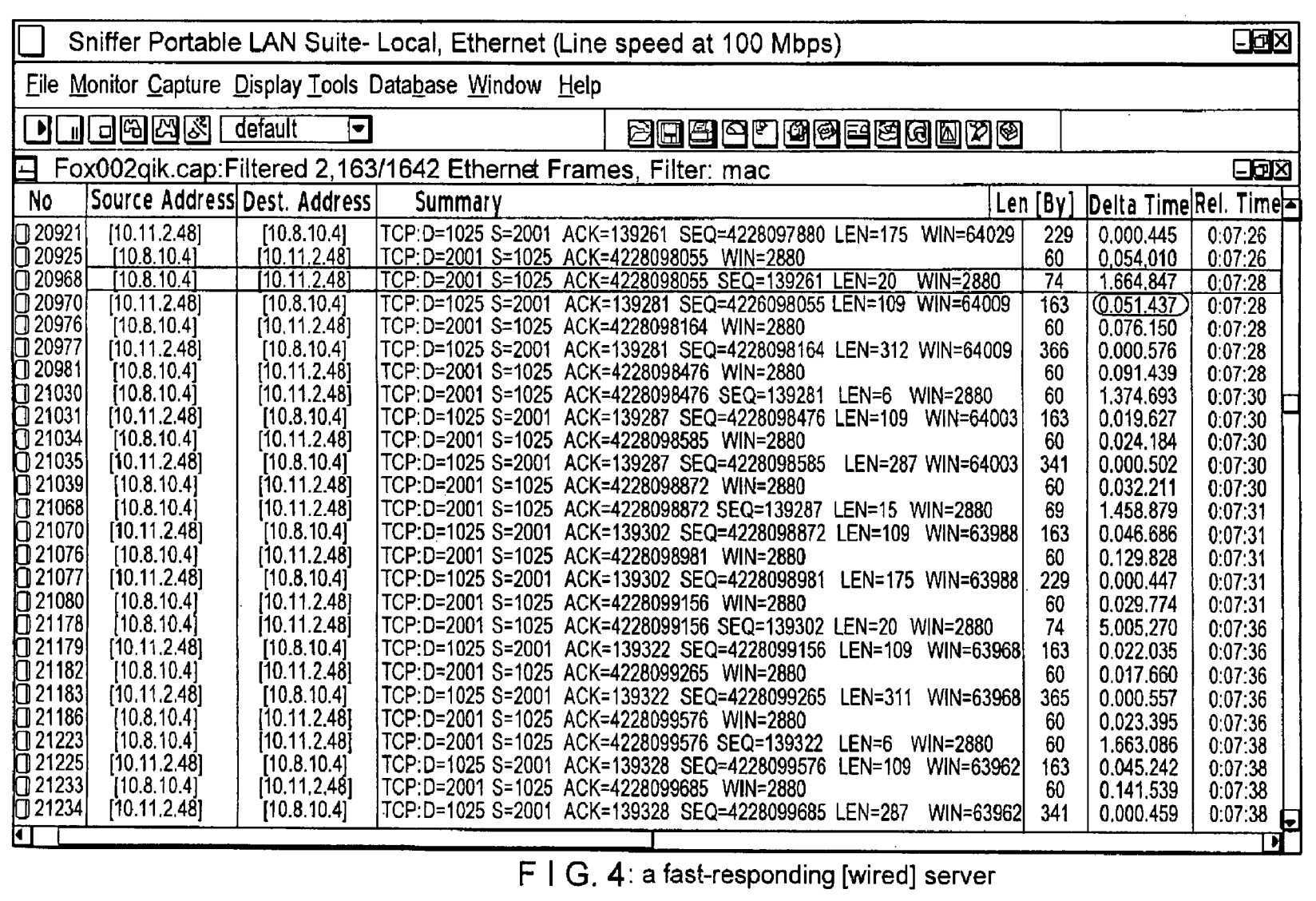

Sniffer Portable LAN Suite- Local, Ethernet (Line speed at 100 Mbps)

File Monitor Capture Display Tools Database Window Help default

Fox002qik.cap:Filtered 2,163/1642 Ethernet Frames, Filter: mac

| No | Source Address | Dest. Address | Summary | Len [By] | Delta Time | Rel. Time |
|---|---|---|---|---|---|---|
| 20921 | [10.11.2.48] | [10.8.10.4] | TCP:D=1025 S=2001 ACK=139261 SEQ=4228097880 LEN=175 WIN=64029 | 229 | 0.000.445 | 0:07:26 |
| 20925 | [10.8.10.4] | [10.11.2.48] | TCP:D=2001 S=1025 ACK=4228098055 WIN=2880 | 60 | 0.054.010 | 0:07:26 |
| 20968 | [10.8.10.4] | [10.11.2.48] | TCP:D=2001 S=1025 ACK=4228098055 SEQ=139261 LEN=20 WIN=2880 | 74 | 1.664.847 | 0:07:28 |
| 20970 | [10.11.2.48] | [10.8.10.4] | TCP:D=1025 S=2001 ACK=139281 SEQ=4226098055 LEN=109 WIN=64009 | 163 | 0.051.437 | 0:07:28 |
| 20976 | [10.8.10.4] | [10.11.2.48] | TCP:D=2001 S=1025 ACK=4228098164 WIN=2880 | 60 | 0.076.150 | 0:07:28 |
| 20977 | [10.11.2.48] | [10.8.10.4] | TCP:D=1025 S=2001 ACK=139281 SEQ=4228098164 LEN=312 WIN=64009 | 366 | 0.000.576 | 0:07:28 |
| 20981 | [10.8.10.4] | [10.11.2.48] | TCP:D=2001 S=1025 ACK=4228098476 WIN=2880 | 60 | 0.091.439 | 0:07:28 |
| 21030 | [10.8.10.4] | [10.11.2.48] | TCP:D=2001 S=1025 ACK=4228098476 SEQ=139281 LEN=6 WIN=2880 | 60 | 1.374.693 | 0:07:30 |
| 21031 | [10.11.2.48] | [10.8.10.4] | TCP:D=1025 S=2001 ACK=139287 SEQ=4228098476 LEN=109 WIN=64003 | 163 | 0.019.627 | 0:07:30 |
| 21034 | [10.8.10.4] | [10.11.2.48] | TCP:D=2001 S=1025 ACK=4228098585 WIN=2880 | 60 | 0.024.184 | 0:07:30 |
| 21035 | [10.11.2.48] | [10.8.10.4] | TCP:D=1025 S=2001 ACK=139287 SEQ=4228098585 LEN=287 WIN=64003 | 341 | 0.000.502 | 0:07:30 |
| 21039 | [10.8.10.4] | [10.11.2.48] | TCP:D=2001 S=1025 ACK=4228098872 WIN=2880 | 60 | 0.032.211 | 0:07:30 |
| 21068 | [10.8.10.4] | [10.11.2.48] | TCP:D=2001 S=1025 ACK=4228098872 SEQ=139287 LEN=15 WIN=2880 | 69 | 1.458.879 | 0:07:31 |
| 21070 | [10.11.2.48] | [10.8.10.4] | TCP:D=1025 S=2001 ACK=139302 SEQ=4228098872 LEN=109 WIN=63988 | 163 | 0.046.686 | 0:07:31 |
| 21076 | [10.8.10.4] | [10.11.2.48] | TCP:D=2001 S=1025 ACK=4228098981 WIN=2880 | 60 | 0.129.828 | 0:07:31 |
| 21077 | [10.11.2.48] | [10.8.10.4] | TCP:D=1025 S=2001 ACK=139302 SEQ=4228098981 LEN=175 WIN=63988 | 229 | 0.000.447 | 0:07:31 |
| 21080 | [10.8.10.4] | [10.11.2.48] | TCP:D=2001 S=1025 ACK=4228099156 WIN=2880 | 60 | 0.029.774 | 0:07:31 |
| 21178 | [10.8.10.4] | [10.11.2.48] | TCP:D=2001 S=1025 ACK=4228099156 SEQ=139302 LEN=20 WIN=2880 | 74 | 5.005.270 | 0:07:36 |
| 21179 | [10.11.2.48] | [10.8.10.4] | TCP:D=1025 S=2001 ACK=139322 SEQ=4228099156 LEN=109 WIN=63968 | 163 | 0.022.035 | 0:07:36 |
| 21182 | [10.8.10.4] | [10.11.2.48] | TCP:D=2001 S=1025 ACK=4228099265 WIN=2880 | 60 | 0.017.660 | 0:07:36 |
| 21183 | [10.11.2.48] | [10.8.10.4] | TCP:D=1025 S=2001 ACK=139322 SEQ=4228099265 LEN=311 WIN=63968 | 365 | 0.000.557 | 0:07:36 |
| 21186 | [10.8.10.4] | [10.11.2.48] | TCP:D=2001 S=1025 ACK=4228099576 WIN=2880 | 60 | 0.023.395 | 0:07:36 |
| 21223 | [10.8.10.4] | [10.11.2.48] | TCP:D=2001 S=1025 ACK=4228099576 SEQ=139322 LEN=6 WIN=2880 | 60 | 1.663.086 | 0:07:38 |
| 21225 | [10.11.2.48] | [10.8.10.4] | TCP:D=1025 S=2001 ACK=139328 SEQ=4228099576 LEN=109 WIN=63962 | 163 | 0.045.242 | 0:07:38 |
| 21233 | [10.8.10.4] | [10.11.2.48] | TCP:D=2001 S=1025 ACK=4228099685 WIN=2880 | 60 | 0.141.539 | 0:07:38 |
| 21234 | [10.11.2.48] | [10.8.10.4] | TCP:D=1025 S=2001 ACK=139328 SEQ=4228099685 LEN=287 WIN=63962 | 341 | 0.000.459 | 0:07:38 |

FIG. 4: a fast-responding [wired] server

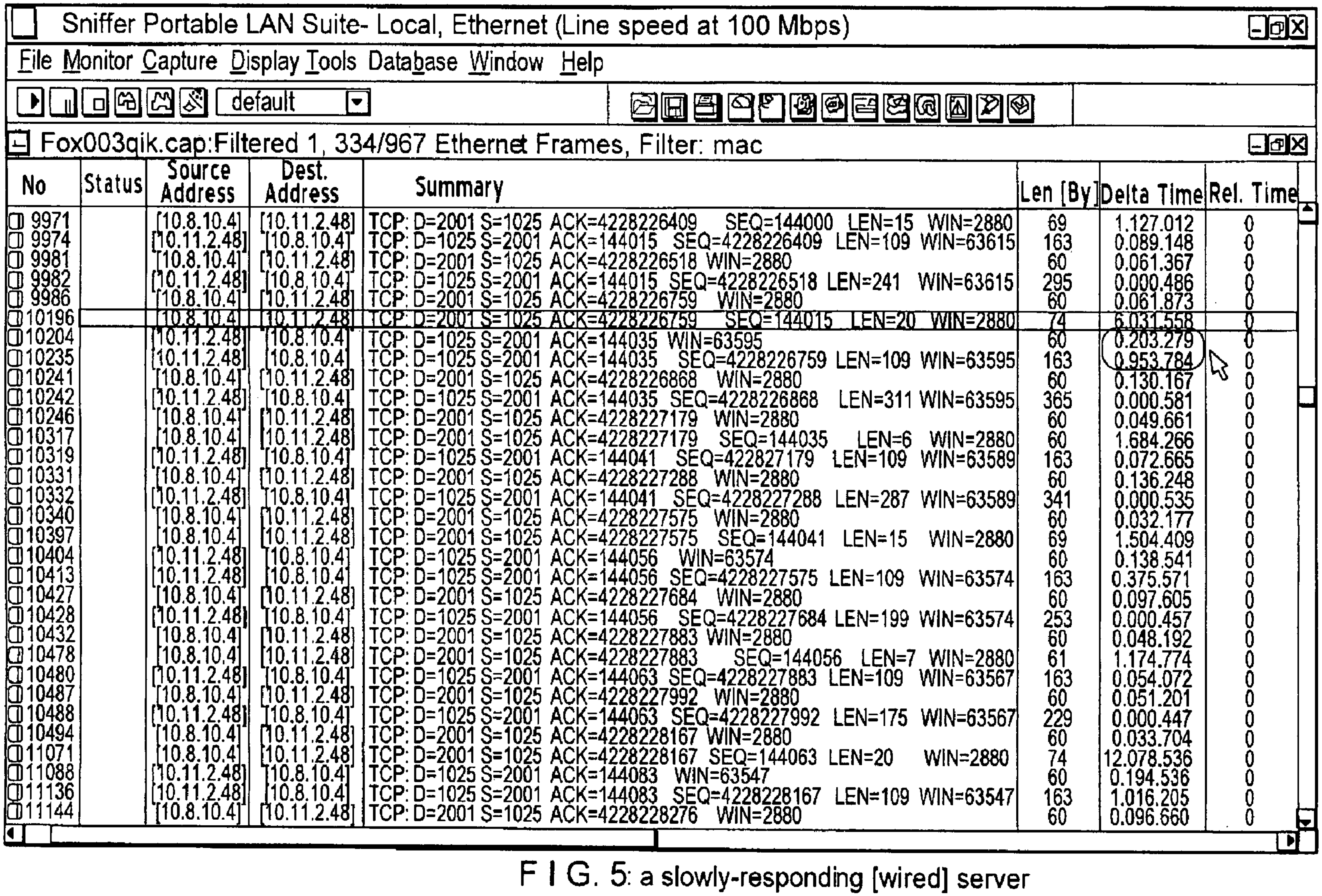

| No | Status | Source Address | Dest. Address | Summary | Len [By] | Delta Time | Rel. Time |
|---|---|---|---|---|---|---|---|
| 9971 | | [10.8.10.4] | [10.11.2.48] | TCP: D=2001 S=1025 ACK=4228226409 SEQ=144000 LEN=15 WIN=2880 | 69 | 1.127.012 | 0 |
| 9974 | | [10.11.2.48] | [10.8.10.4] | TCP: D=1025 S=2001 ACK=144015 SEQ=4228226409 LEN=109 WIN=63615 | 163 | 0.089.148 | 0 |
| 9981 | | [10.8.10.4] | [10.11.2.48] | TCP: D=2001 S=1025 ACK=4228226518 WIN=2880 | 60 | 0.061.367 | 0 |
| 9982 | | [10.11.2.48] | [10.8.10.4] | TCP: D=1025 S=2001 ACK=144015 SEQ=4228226518 LEN=241 WIN=63615 | 295 | 0.000.486 | 0 |
| 9986 | | [10.8.10.4] | [10.11.2.48] | TCP: D=2001 S=1025 ACK=4228226759 WIN=2880 | 60 | 0.061.873 | 0 |
| 10196 | | [10.8.10.4] | [10.11.2.48] | TCP: D=2001 S=1025 ACK=4228226759 SEQ=144015 LEN=20 WIN=2880 | 74 | 6.031.558 | 0 |
| 10204 | | [10.11.2.48] | [10.8.10.4] | TCP: D=1025 S=2001 ACK=144035 WIN=63595 | 60 | 0.203.279 | 0 |
| 10235 | | [10.11.2.48] | [10.8.10.4] | TCP: D=1025 S=2001 ACK=144035 SEQ=4228226759 LEN=109 WIN=63595 | 163 | 0.953.784 | 0 |
| 10241 | | [10.8.10.4] | [10.11.2.48] | TCP: D=2001 S=1025 ACK=4228226868 WIN=2880 | 60 | 0.130.167 | 0 |
| 10242 | | [10.11.2.48] | [10.8.10.4] | TCP: D=1025 S=2001 ACK=144035 SEQ=4228226868 LEN=311 WIN=63595 | 365 | 0.000.581 | 0 |
| 10246 | | [10.8.10.4] | [10.11.2.48] | TCP: D=2001 S=1025 ACK=4228227179 WIN=2880 | 60 | 0.049.661 | 0 |
| 10317 | | [10.8.10.4] | [10.11.2.48] | TCP: D=2001 S=1025 ACK=4228227179 SEQ=144035 LEN=6 WIN=2880 | 60 | 1.684.266 | 0 |
| 10319 | | [10.11.2.48] | [10.8.10.4] | TCP: D=1025 S=2001 ACK=144041 SEQ=422827179 LEN=109 WIN=63589 | 163 | 0.072.665 | 0 |
| 10331 | | [10.8.10.4] | [10.11.2.48] | TCP: D=2001 S=1025 ACK=4228227288 WIN=2880 | 60 | 0.136.248 | 0 |
| 10332 | | [10.11.2.48] | [10.8.10.4] | TCP: D=1025 S=2001 ACK=144041 SEQ=4228227288 LEN=287 WIN=63589 | 341 | 0.000.535 | 0 |
| 10340 | | [10.8.10.4] | [10.11.2.48] | TCP: D=2001 S=1025 ACK=4228227575 WIN=2880 | 60 | 0.032.177 | 0 |
| 10397 | | [10.8.10.4] | [10.11.2.48] | TCP: D=2001 S=1025 ACK=4228227575 SEQ=144041 LEN=15 WIN=2880 | 69 | 1.504.409 | 0 |
| 10404 | | [10.11.2.48] | [10.8.10.4] | TCP: D=1025 S=2001 ACK=144056 WIN=63574 | 60 | 0.138.541 | 0 |
| 10413 | | [10.11.2.48] | [10.8.10.4] | TCP: D=1025 S=2001 ACK=144056 SEQ=4228227575 LEN=109 WIN=63574 | 163 | 0.375.571 | 0 |
| 10427 | | [10.8.10.4] | [10.11.2.48] | TCP: D=2001 S=1025 ACK=4228227684 WIN=2880 | 60 | 0.097.605 | 0 |
| 10428 | | [10.11.2.48] | [10.8.10.4] | TCP: D=1025 S=2001 ACK=144056 SEQ=4228227684 LEN=199 WIN=63574 | 253 | 0.000.457 | 0 |
| 10432 | | [10.8.10.4] | [10.11.2.48] | TCP: D=2001 S=1025 ACK=4228227883 WIN=2880 | 60 | 0.048.192 | 0 |
| 10478 | | [10.8.10.4] | [10.11.2.48] | TCP: D=2001 S=1025 ACK=4228227883 SEQ=144056 LEN=7 WIN=2880 | 61 | 1.174.774 | 0 |
| 10480 | | [10.11.2.48] | [10.8.10.4] | TCP: D=1025 S=2001 ACK=144063 SEQ=4228227883 LEN=109 WIN=63567 | 163 | 0.054.072 | 0 |
| 10487 | | [10.8.10.4] | [10.11.2.48] | TCP: D=2001 S=1025 ACK=4228227992 WIN=2880 | 60 | 0.051.201 | 0 |
| 10488 | | [10.11.2.48] | [10.8.10.4] | TCP: D=1025 S=2001 ACK=144063 SEQ=4228227992 LEN=175 WIN=63567 | 229 | 0.000.447 | 0 |
| 10494 | | [10.8.10.4] | [10.11.2.48] | TCP: D=2001 S=1025 ACK=4228228167 WIN=2880 | 60 | 0.033.704 | 0 |
| 11071 | | [10.8.10.4] | [10.11.2.48] | TCP: D=2001 S=1025 ACK=4228228167 SEQ=144063 LEN=20 WIN=2880 | 74 | 12.078.536 | 0 |
| 11088 | | [10.11.2.48] | [10.8.10.4] | TCP: D=1025 S=2001 ACK=144083 WIN=63547 | 60 | 0.194.536 | 0 |
| 11136 | | [10.11.2.48] | [10.8.10.4] | TCP: D=1025 S=2001 ACK=144083 SEQ=4228228167 LEN=109 WIN=63547 | 163 | 1.016.205 | 0 |
| 11144 | | [10.8.10.4] | [10.11.2.48] | TCP: D=2001 S=1025 ACK=4228228276 WIN=2880 | 60 | 0.096.660 | 0 |

FIG. 5: a slowly-responding [wired] server

SYSTEM AND METHOD FOR DETECTING A DELAY IN A COMPUTER NETWORK

BACKGROUND INFORMATION

In a conventional wireless network, a mobile unit ("MU") (e.g., a barcode scanner) may experience a communication delay when processing communications transmitted and received over the network. For example, an employee using the scanner may scan a barcode on an item while performing an inventory task. A display on the scanner may show a price/number available of the item which is retrieved from a database coupled to the network. When the MU experiences a delay in showing the price, the employee will typically attribute the delay to a problem in the wireless network (e.g., congestion, weak signal). However, the problem may be due to a condition on a wired side of the network (e.g., a server, the database, etc.). Thus, there is a need to measure the delay and detect a source thereof.

SUMMARY OF THE INVENTION

The present invention is related to a system comprising a computing device, a wireless computing unit and a network management arrangement ("NMA"). The NMA receives a first signal and a second signal from the computing device. The NMA transmits the second signal to the unit and receives a third signal from the unit. The NMA determines a first time value indicative of a difference between a time of receipt of the first signal and a time of receipt of the second signal. The NMA compares the first time value to a first threshold range to generate a first output data. The NMA determines a second time value indicative of a difference between a time of transmission of the second signal and a time of receipt of the third signal. The NMA compares the second time value to a second threshold range to generate second output data. The NMA executes a response procedure as a function of at least one of the first and second output data.

BRIEF DESCRIPTION OF THE DRAWINGS

FIG. 4 shows an exemplary embodiment of a fast-responding server according to the present invention; and FIG. 5 shows an exemplary embodiment of a slow-responding server according to the present invention.

DETAILED DESCRIPTION

Figure 1:
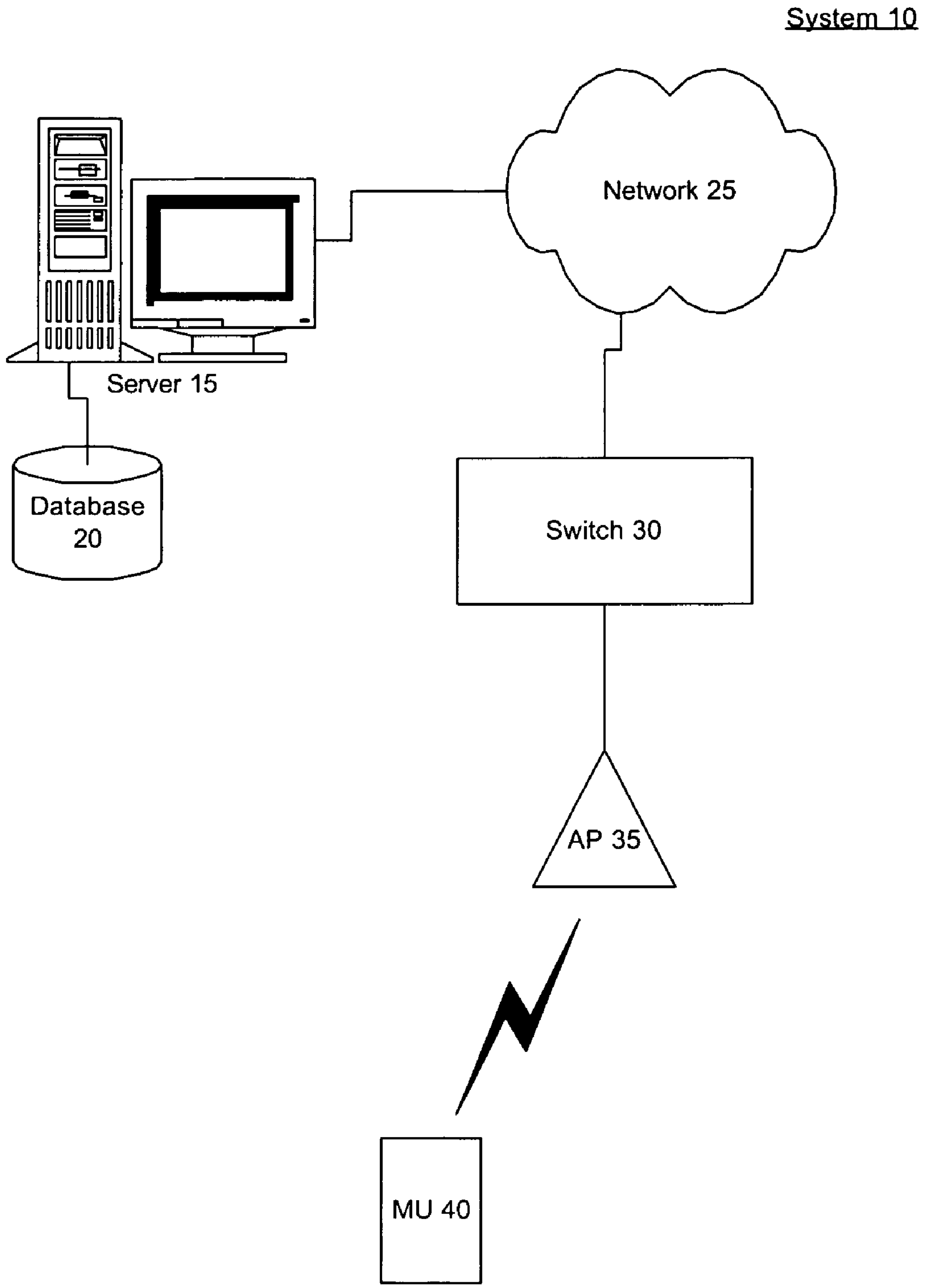
FIG. 1 is an exemplary embodiment of a system according to the present invention.

The present invention may be further understood with reference to the following description and the appended drawings, wherein like elements are provided with the same reference numerals. The present invention provides a system and a method for detecting a delay in a computing network. An exemplary embodiment of the present invention will be described with respect to the computing network including a wired-side and a wireless-side. Those of skill in the art will understand that the present invention may be utilized only on the wired-side and/or only on the wireless-side of the computing network.

FIG. 1 shows an exemplary embodiment of a system 10 according to the present invention. The system 10 may include a server 15 which hosts one or more applications and further includes a wired network adaptor, a device driver software and an operating system software. The server 15 may include a storage arrangement (e.g., a memory) or be coupled to a stand-alone database 20 which includes, for example, product data (e.g., price, location, stock, etc.). When the server 15 receives a data request, it may execute a database application which accesses the product data in the database 20. The product data may be transmitted to a requester as a response to the data request, which will be described below.

The server 15 may be coupled to a communications network 25 (e.g., the Internet, LAN, WLAN, etc.). Those of skill in the art will understand that the network 25 may include any number and type of infrastructure devices (e.g., servers, routers, hubs, switches, etc.). For example, the infrastructure devices may route the data request to the server 15 and the response to the requester.

As shown in FIG. 1, one exemplary embodiment of the system 10 may include a network management arrangement (e.g., a switch 30) coupled to the network 25. The switch 30 may then be coupled to one or more access ports ("APs") 35. While the present invention will be described with reference to the switch 30 and the AP 35, those of skill in the art will understand that in another embodiment of the system 10, for example, one or more access points may be directly coupled to the network 25, without use of the switch 30.

In either embodiment, the switch 30 and the AP 35 and/or the access point may be utilized as a wired/wireless interface converting a packet from a wired protocol (e.g., TCP/IP) to a wireless protocol (e.g., 802.11), and vice-versa. For example, while the response to the data request is being routed from the server 15 and within the network 25, it may be formatted according to the wired protocol. However, upon receipt of the response, the AP 35 may convert it to the wireless protocol for transmission on a radio frequency ("RF") channel. Those of skill in the art will understand that the conversion of the data request and/or response may take place at the switch 30, the AP 35 and/or the access point, depending on the embodiment which is utilized.

According to the present invention, the switch 30 may include a monitoring application (e.g., a sniffer) for monitoring network traffic which passes therethrough. For example, transmissions received from the network 25 and the AP 35 may be monitored by the switch 30. The switch 30 may provide a log which is viewable on a display of the server 15 via, for example, an interface application for the switch 30. The log may include traffic data indicative of transmissions received by the switch 30. The traffic data may include a time of arrival, a size, a source and a destination of each transmission received by the switch 30. The traffic data may be utilized to detect delays within the system 10, as will be described below.

The AP 35 may be wirelessly coupled to a mobile unit ("MU") 40 which may be, for example, a image- or laser-based scanner, an RFID reader, a cell phone, a laptop, a PDA, a network interface card, a handheld computer or any other wireless computing device. The MU 40 may include a processor and a memory which stores an operating system software and one or more applications (e.g., for scanning a barcode or communicating with an RFID tag). The MU 40 may further include a display for displaying output (e.g., the product data) to a user and a network adaptor for transmitting and receiving signals from the AP 35. Those of skill in the art will understand that the MU 40 may include a further network adaptor for coupling to, for example, the server 15 or any infrastructure device for a data exchange therewith.

In operation, the user may be taking inventory and scan a barcode on an item using the MU 40. The barcode may be included in the data request which may further include a request for a price and a number available of the item. The data request is transmitted from the MU 40 to the AP 35 over the RF channel. The data request is then routed to the server 15 which utilizes the database application to obtain the product data corresponding to the barcode from the database 20. Prior to execution of the database application, the server 15 transmits an acknowledgment packet ("ACK") to the MU 40. Those of skill in the art will understand that transmission of the ACK may occur for each data request (or other packet) received by the server 15, in accordance with the wired protocol.

Generation and transmission of the ACK may be controlled by a network driver on the server 15. As is known in the art, the driver may also determine whether the response (e.g., the product data) may be included with the ACK, i.e., "piggy-backed" thereon. That is, when the product data is immediately available or obtained quickly by the server 15, the response may be piggy-backed on the ACK. Otherwise, the server 15 responds to the data request with the ACK, obtains the product data, and transmits the response in a transmission separate from the ACK. When the MU 40 receives the response, it will transmit an ACK to the server 15. As is known in the art, the processor in the MU 40 may not be fast enough to piggy-back a further response on the ACK.

Figure 3:
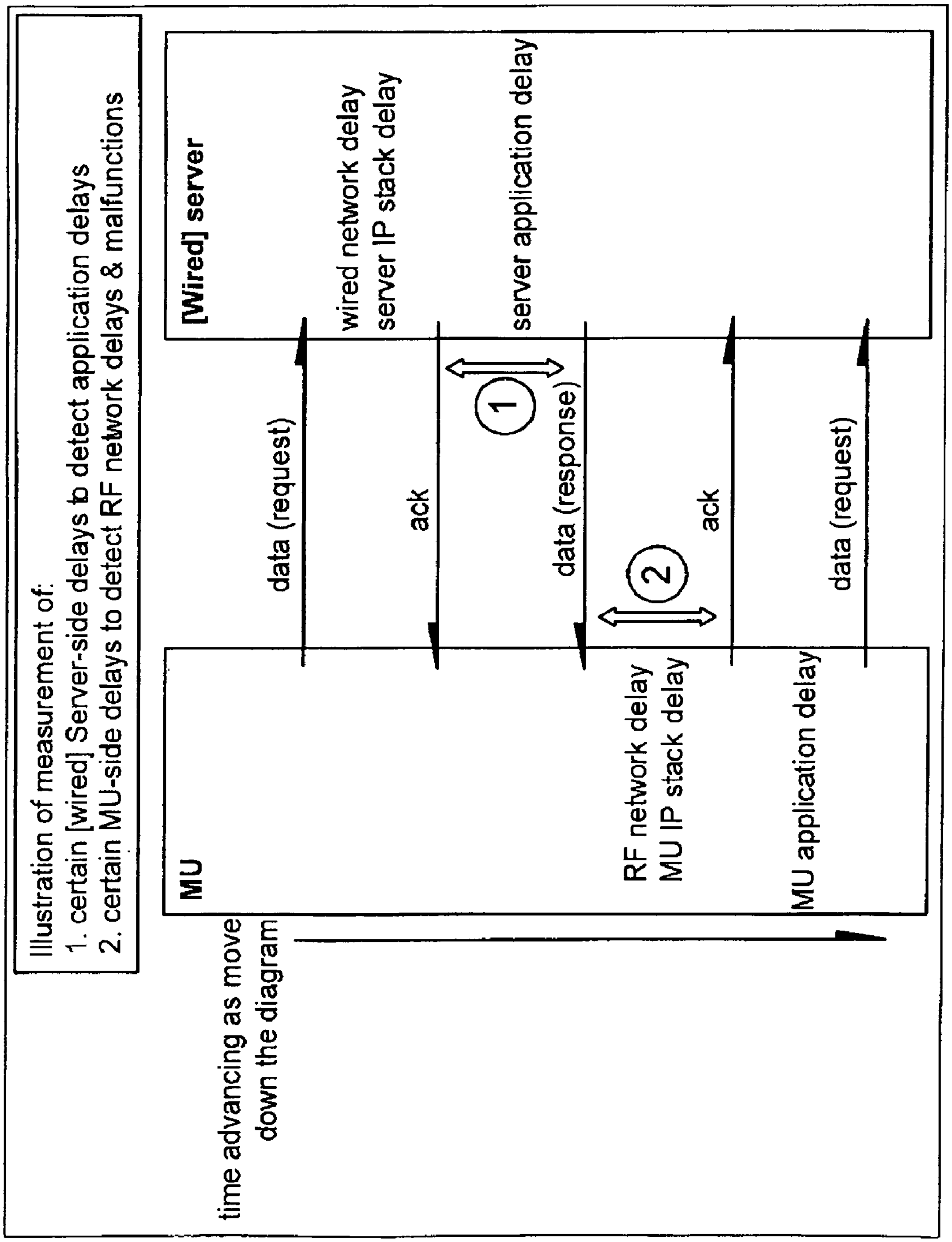
FIG. 3 shows a schematic representation of packet exchange according to the present invention.

According to the present invention, during communication between the server 15 and the MU 40, the switch 30 may generate the traffic data by executing the monitoring application. From the traffic data, the switch 30 may determine a first time value between reception of the ACK and reception of the response by the server 15. The first time value is schematically shown at 1 in FIG. 3. The first time value may be directly proportional to an execution speed for the database application running on the server 15. Also from the traffic data, the switch 30 may determine a second time value between transmission of the response to the MU 40 and reception of the ACK by the switch 30. The second time value is schematically shown at 2 in FIG. 3. The second time value may be indicative of a lag in the RF environment and/or at the MU 40 due to, for example, one or more re-transmissions of the response by the switch 30 and/or the ACK by the MU 40, or a malfunction in the MU 40 and/or the AP 35.

In one exemplary embodiment, each transmission (e.g., the data request, the ACKs, the response) may include a timestamp which allows the first and second delays to be calculated. In another embodiment, a timer begins at an initiation of a transmission. For example, after the switch 30 receives the ACK from the server 15, the timer begins running and stops after the response is received. A value obtained from the timer in this example may be indicative of the first time value. Thus, the time for each transmission and/or between consecutive transmissions (e.g., the ACK and the response) may be recorded in the log which may be viewable on the server 15.

The first time and the second time may be utilized to determine one or more delays experienced by the system 10. By diagnosing the delay(s), a network administrator may correct a problem/condition causing the delay increasing efficiency of the system 10 and making the user's experience more productive. Furthermore, identification of the problem/condition may lead the network administrator to minimize the delays optimizing and increasing a throughput of the system 10.

In one embodiment, the delays are detected based on first and second threshold parameters which may include a first range and a second range, respectively. In this embodiment, the first time value may be compared to the first range (e.g., about 200-300 msec) to generate first output data which may be indicative of a first delay. If the first time value falls outside of the first range, the first output data may indicate that the server 15, the application on the server 15 and/or the database 20 is experiencing the problem/condition. FIG. 4 shows an exemplary embodiment of a fast-responding server, whereas, FIG. 5 shows an exemplary embodiment of a slow-responding server which may be experiencing the first delay.

Similarly, the second time value may be compared to the second range (e.g., about 50-100 msec) to generate second output data indicative of a second delay. If the second time value falls outside of the second range, the second output data may indicate that the MU 40 and/or the application running thereon is experiencing the problem/condition. Thus, the first delay may be indicative of delay(s) on the wired side of the system 10, and the second delay may be indicative of delay(s) on the wireless side of the system 10. Those of skill in the art will understand that even if the first and/or second time values are lower than minimum values in the first and second ranges, respectively, that may indicate the existence of the problem/condition. For example, a minimum value (e.g., 200 msec) may be indicative of a fastest time between events (e.g., ACK and the response). Thus, if the response is received after only 100 msec, it may be incomplete or erroneous.

In another embodiment, the threshold parameters may be singular values. For example, after the first time value is measured, it may be compared with a first threshold value (e.g., 300 msec). If the first time value surpasses the first threshold value, the first output data may indicate that the server 15, the application on the server 15 and/or the database 20 is experiencing the problem/condition which is introducing and/or contributing to the overall delay. In another example, after the second time value is measured, it may be compared with a second threshold value (e.g., 100 msec). If the second time value surpasses the second threshold value, the second output data may indicate that the MU 40 and/or the application running thereon is experiencing the problem/condition which is introducing and/or contributing to the delay in the system 10.

When the first and/or second delays are detected, a response procedure may be executed. That is, the response procedure may be executed as a function of the first and/or second output data. The response procedure may include an alert displayed on the server 15, transmitted to a network administrator and/or transmitted to the MU 40. The alert may indicate a duration and a time of occurrence of the first and/or second delay. For example, the first and/or second delays may be highlighted on the log. In this manner, the network administrator and/or the user may be notified of a source of the delay and take appropriate actions for correction thereof. For example, the application(s) may be removed/repaired/reinstalled, the MU 40 may be repaired/exchanged, a trace may be run to determine a precise reason for the delay, etc.

Figure 2:
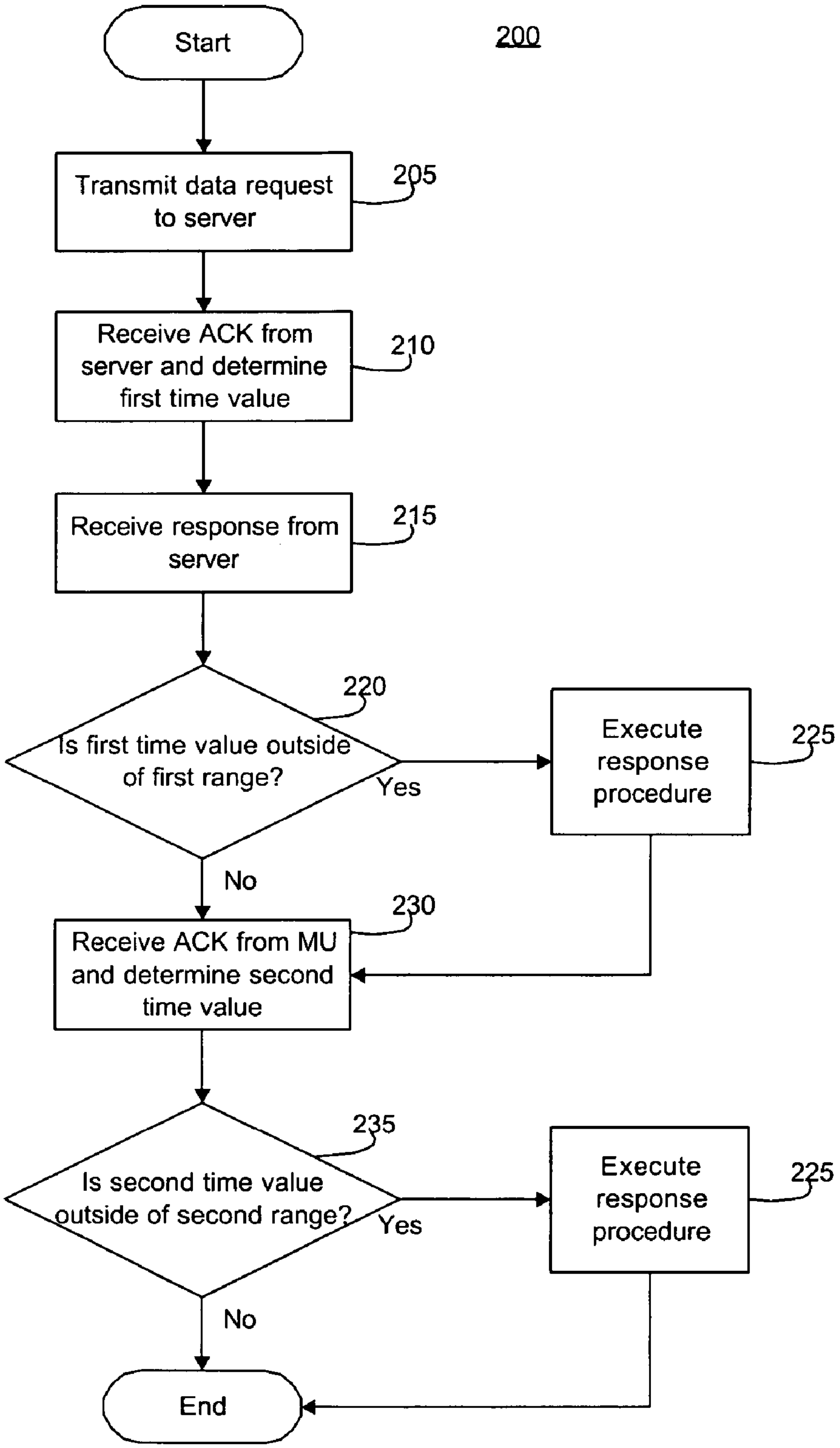
FIG. 2 is an exemplary embodiment of a method according to the present invention.

FIG. 2 shows an exemplary embodiment of a method 200 according to the present invention. In step 205, the switch 30 receives the data request from the MU 40 and transmits the data request to the server 15. As understood by those of skill in the art, the present invention may be utilized during any communication between the MU 40 and the server 15, and is not limited to transmission and fulfillment of the data request. Also, the switch 30 may utilize the monitoring application on any communication(s) passing therethrough between any number of devices directly or remotely coupled thereto.

As described above, the data request may include the barcode of the item scanned. Although, the method 200 will be described with respect to scanning the barcode, those of skill in the art will understand that the present invention may be utilized in any computer network which provides for communication between two endpoint devices via an intermediate computing device.

In step 210, the switch 30 receives the ACK from the server 15. Upon receipt, the switch 30 may identify the time of arrival of the ACK by, for example, viewing the timestamp thereon and/or initiating the timer. In another embodiment, the switch 30 may simply note the time of arrival from an internal clock thereof.

In step 215, the switch 30 receives the response from the server 15 and determines the first time value. In one instance, the server 15 transmits the ACK substantially immediately after receiving the data request. In another instance, if the product data is readily available, the response is piggy-backed on the ACK. Thus, the ACK and the response may be two separate transmissions or included in a single transmission. That is, if the product data is not available, the ACK is transmitted alone, and the server 15 fulfills the data request by obtaining the product data from the database 20. The product data is included in the response, and the response is transmitted to the MU 40.

The switch 30 determines the first time value by, for example, measuring a difference between the time of receipt of the ACK and the time of receipt of the response. Those of skill in the art will understand that the first time may correspond only to the time of receipt of the response, if the response has been piggy-backed on the ACK.

In step 220, the switch 30 compares the first time value to the first threshold parameter to generate the first output data which may be indicative of the first delay. As described above, the first threshold parameter may be the first range. When the first time value is outside of the first range, the first output data is indicative of an existence of the first delay. The switch 30 executes the response procedure as a function of the first output data, as shown in step 225. The switch 30 may transmit the alert to the server 15 and/or highlight the first delay on the log displayed on the server 15.

In step 230, the switch 30 receives the ACK from the MU 40. Those of skill in the art will understand that the measurement/timing of the first and second time values may occur in parallel with communications conducted by the switch 30. That is, the switch 30 may not hold the response while calculating the first time value. Upon receipt of the ACK, the switch 30 determines the second time value as a time between transmission of the response and receipt of the ACK from the MU 40. As described above, the MU 40 may transmit the ACK substantially immediately after receiving the response, because the processor of the MU 40 may not be fast enough to piggyback any further information (e.g., packets, requests) on the ACK.

In step 235, the switch 15 compares the second time value to the second threshold parameter to generate the second output data which may be indicative of the second delay. As described above, the second threshold parameter may be the second range. When the second time value is outside of the second range, the second output data indicates an existence of the second delay. The switch 14 executes the response procedure as a function of the second delay, as shown in step 225.

Detection and measurement of the first and second delays may provide valuable information to the network administrator and the user(s). For example, the network administrator may not waste time and/or money modifying the RF environment when a reason for an overall delay has been attributed to the first delay. That is, when the overall delay is recognized, the network administrator may deploy more APs to compensate for congestion in the RF environment. However, when the problem is identified on the wired-side of the system 10, the network administrator may focus efforts and resources on repairing/replacing the server 15, the database 20 and/or any other device on the wired-side.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A system, comprising:

a computing device;

a wireless computing unit; and a network management arrangement ("NMA") receiving a first signal and a second signal from the computing device; the NMA forwarding the second signal to the unit and receiving a third signal from the unit as an acknowledgment of receipt of the second signal, wherein, the NMA determines a first time value indicative of a difference between a time of receipt of the first signal and a time of receipt of the second signal, and wherein, the NMA compares the first time value to a first threshold range to generate a first output data, and wherein, the NMA determines a second time value indicative of a difference between a time of transmission of the second signal and a time of receipt of the third signal, and wherein, the NMA compares the second time value to a second threshold range to generate second output data, and wherein, the NMA executes a response procedure as a function of at least one of the first and second output data.

2. The system according to claim 1, wherein the computing device includes at least one of a server and a database.

3. The system according to claim 1, wherein the unit includes at least one of a laser-based scanner, an image-based scanner, an RFID reader, an RFID tag, a cell phone and a PDA.

4. The system according to claim 1, wherein the NMA includes a switch.

5. The system according to claim 1, wherein the first signal is an acknowledgment, the second signal is a data response, and the third signal is a further acknowledgment.

6. The system according to claim 1, wherein the first threshold range is about 200 ms-300 ms.

7. The system according to claim 1, wherein the second threshold is about 50 ms-100 ms.

8. The system according to claim 1, wherein the first output data is indicative of a delay in at least one of the computing device and a communications link between the NMA and the computing device.

9. The system according to claim 1, wherein the second output data is indicative of a delay in at least one of the unit and a communications link between the NMA and the unit.

10. The system according to claim 1, wherein the response procedure is an alert transmitted to at least one of the unit and the computing device, the alert including at least one of the first time value and the second time value.

11. A method, comprising:

receiving, by a network management arrangement ("NMA"), a first signal and a second signal from a computing device;

forwarding, by the NMA, the second signal to a wireless computing unit;

receiving a third signal from the unit by the NMA, the third signal being indicative of an acknowledgment of receipt of the second signal;

determining, by the NMA, a first time value indicative of a difference between a time of receipt of the first signal and a time of receipt of the second signal, and comparing the first time value to a first threshold range to generate a first output data;

determining, by the NMA, a second time value indicative of a difference between a time of transmission of the second signal and a time of receipt of the third signal;

comparing the second time value to a second threshold range to generate second output data;

executing a response procedure as a function of at least one of the first and second output data.

12. The method according to claim 11, wherein the computing device includes at least one of a server and a database.

13. The method according to claim 11, wherein the unit includes at least one of a laser-based scanner, an image-based scanner, an RFID reader, an RFID tag, a cell phone and a PDA.

14. The method according to claim 11, wherein the NMA includes a switch.

15. The method according to claim 11, wherein the first signal is an acknowledgment, the second signal is a data response, and the third signal is a further acknowledgment.

16. The method according to claim 11, wherein the first threshold range is about 200 ms-300 ms.

17. The method according to claim 11, wherein the second threshold is about 50 ms-100 ms.

18. The method according to claim 11, wherein the first output data is indicative of a delay in at least one of the computing device and a communications link between the NMA and the computing device.

19. The method according to claim 11, wherein the second output data is indicative of a delay in at least one of the unit and a communications link between the NMA and the unit.

20. The method according to claim 11, wherein the response procedure is an alert transmitted to at least one of the unit and the computing device, the alert including at least one of the first time value and the second time value.

21. A network management arrangement, comprising:

a processor;

a communications arrangement coupled to a computing device; and a memory, wherein, the communications arrangement receives a first signal and a second signal from the computing device, wherein, the processor determines a time value indicative of a difference between a time of receipt of the first signal and a time of receipt of the second signal, wherein, the processor compares the time value to a threshold range stored in the memory to generate output data, wherein, the processor executes a response procedure in response to the output data.

* * * * *